US009525834B1

(12) United States Patent
Gaberl et al.

(10) Patent No.: US 9,525,834 B1
(45) Date of Patent: Dec. 20, 2016

(54) OPTICAL DETECTION SYSTEM INCORPORATING PHOTODETECTOR CLUSTERING

(71) Applicant: Avago Technologies General IP (Singapore) Pte. Ltd., Singapore (SG)

(72) Inventors: Wolfgang Gaberl, Vienna (AT); Milos Davidovic, Vienna (AT); Gunther Steinle, Regensburg (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/869,187

(22) Filed: Sep. 29, 2015

(51) Int. Cl.
*H04N 5/235* (2006.01)
*H04N 5/369* (2011.01)
*H04N 5/232* (2006.01)
*H04N 5/378* (2011.01)

(52) U.S. Cl.
CPC ........ *H04N 5/3698* (2013.01); *H04N 5/23245* (2013.01); *H04N 5/378* (2013.01)

(58) Field of Classification Search
CPC ................................................... H04N 5/3698
See application file for complete search history.

(56) References Cited

U.S. PATENT DOCUMENTS

7,952,062 B2   5/2011   Zheng et al.
8,314,867 B2   11/2012  Barna et al.

*Primary Examiner* — Gary C Vieaux (57) ABSTRACT

An optical detection system can include a set of photodetectors and a set of pixel processing circuits for processing pixel information provided by the set of photodetectors. A set of switches interposed between the set of photodetectors and the set of pixel processing circuits can be selectively activated to place the optical detection system in a first mode of operation that allows for optical detection using a subset of pixel processing circuits. The remaining pixel processing circuits that are not used during the first mode of operation can be placed in a power down condition for conserving power. The set of switches can then be re-activated as needed, to place the optical detection system in a second mode of operation that allows for optical detection using a larger number of pixel processing circuits than used during the first mode of operation.

20 Claims, 11 Drawing Sheets

OPTICAL DETECTION SYSTEM INCORPORATING PHOTODETECTOR CLUSTERING

FIELD OF THE INVENTION

The invention relates to optical systems, and more particularly, to optical detection systems that minimize power consumption.

BACKGROUND

Optical detection systems typically employ an image sensor having an array of photodetectors to detect incident light and then use information derived from the detected light for various purposes. In one example application, a time-of-flight (TOF) distance measuring system uses an image sensor to detect a target object and uses information derived from the detection to calculate a distance between the target object and the optical detection system. The accuracy of the distance measurement in the TOF distance measuring system is dependent upon a number of factors such as, for example, a pixel density of the image sensor and the nature of the processing carried out upon the information provided by the image sensor.

In another example application, a digital camera uses an image sensor to detect light information associated with a target object and use the detected light information to generate an image of the target object. As is generally known, the quality of the generated image is largely dependent on the pixel density of the image sensor and the nature of the processing circuitry in the digital camera. Consequently, it is desirable in most applications, to use an image sensor having a high pixel density and to couple this image sensor to a sophisticated processing circuit that can process the large amount of information provided by the high pixel density.

Unfortunately, using an image sensor with a high pixel density can lead to an undesirably high level of power consumption in the image sensor as well as in the processing circuitry coupled to the image sensor. The power consumption issue has been traditionally addressed by either compromising on the size of the image sensor that is used, or by using various techniques to minimize the amount of processing carried out by the processing circuitry coupled to a high pixel density sensor.

Among the various techniques used to minimize the amount of processing carried out by the processing circuitry, one technique involves processing only a subset of pixel information obtained from the image sensor. Even if this approach were to provide certain advantages in terms of image processing, it can be appreciated that in terms of power consumption, the use a one-size-fits-all imaging sensor that consumes power while generating more pixel information than needed is generally undesirable.

It is therefore desirable to provide an optical detection system that addresses at least some of the issues associated with traditional optical detection systems.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale, emphasis instead being placed upon illustrating the principles of the invention. The drawings should not be interpreted as limiting the scope of the invention to the example embodiments shown herein.

WRITTEN DESCRIPTION

Throughout this description, embodiments and variations are described for the purpose of illustrating uses and implementations of inventive concepts. The illustrative description should be understood as presenting examples of inventive concepts, rather than as limiting the scope of the concept as disclosed herein. It should be further understood that certain words and terms are used herein solely for convenience and such words and terms should be interpreted as referring to various objects and actions that are generally understood in various forms and equivalencies by persons of ordinary skill in the art. For example, words such as "set" and "sub-set" can be used in an alternative manner to words such as "cluster" or "group," the word "photodetector" can be used to refer to various kinds of light sensing elements (such as, for example, a photodiode, a photocell, or a complementary metal oxide semiconductor (CMOS) imaging sensor), and the word "switch" can generally refer to various types of switching elements (such as, for example, a solid state switch or a micro-mechanical switch). It should also be understood that the word "example" as used herein is intended to be non-exclusionary and non-limiting in nature. More particularly, the word "exemplary" as used herein indicates one among several examples, and it must be understood that no undue emphasis or preference is being directed to the particular example being described.

In terms of a general overview, an optical detection system in accordance with the disclosure can include a set of photodetectors and a set of pixel processing circuits for processing pixel information provided by the set of photodetectors. A set of switches is interposed between the set of photodetectors and the set of pixel processing circuits. Various switches in the set of switches can be selectively activated to place the optical detection system in a first mode of operation that allows for optical detection using a subset of pixel processing circuits. The remaining pixel processing circuits that are not used during the first mode of operation can be placed in a power down condition for conserving power. Some or all of the switches that are placed in the power down condition can be re-activated as needed in order to place the optical detection system in a second mode of operation that allows for optical detection using a larger number of pixel processing circuits than used during the first mode of operation.

In a first exemplary application, the first mode of operation can be a low resolution mode of operation wherein a cluster of photodetectors is connected to a limited number of pixel processing circuits for detecting a target object when the target object is present in a field of view of the optical detection system or when the target object enters the field of view of the optical detection system. For example, a single pixel processing circuit can be coupled to the cluster of photodetectors in order to detect the target object over the entire field of view of the optical detection system. If no target object is present, the low resolution mode of operation is persisted in order to conserve power. However, when a target object is detected, the optical detection system can be transitioned from the low resolution mode of operation to a high resolution mode of operation. In the high resolution mode of operation, several individual photodetectors are connected to corresponding pixel processing circuits by using a one-to-one connection arrangement. The individual pixel processing circuits can process pixel information corresponding to respective segments of the field of view thereby allowing the optical detection system to provide high resolution.

In a second exemplary application, the optical system can be placed in a third mode of operation. In the third mode of operation, light intensity that is incident upon a first sub-set of segments of a photodetector array is detected first, followed by detection of light intensity that is incident upon a second sub-set of segments of the photodetector array. A relative difference in light intensities incident upon the first and second sub-set of segments of the photodetector array can then be used in various ways. For example, the relative difference in light intensities can be used as a part of testing during manufacture of a product for identifying a lens misalignment, or for performing a lens alignment procedure, or for deactivating certain pixel processing circuits that are misaligned with respect to a lens.

Figure 1:
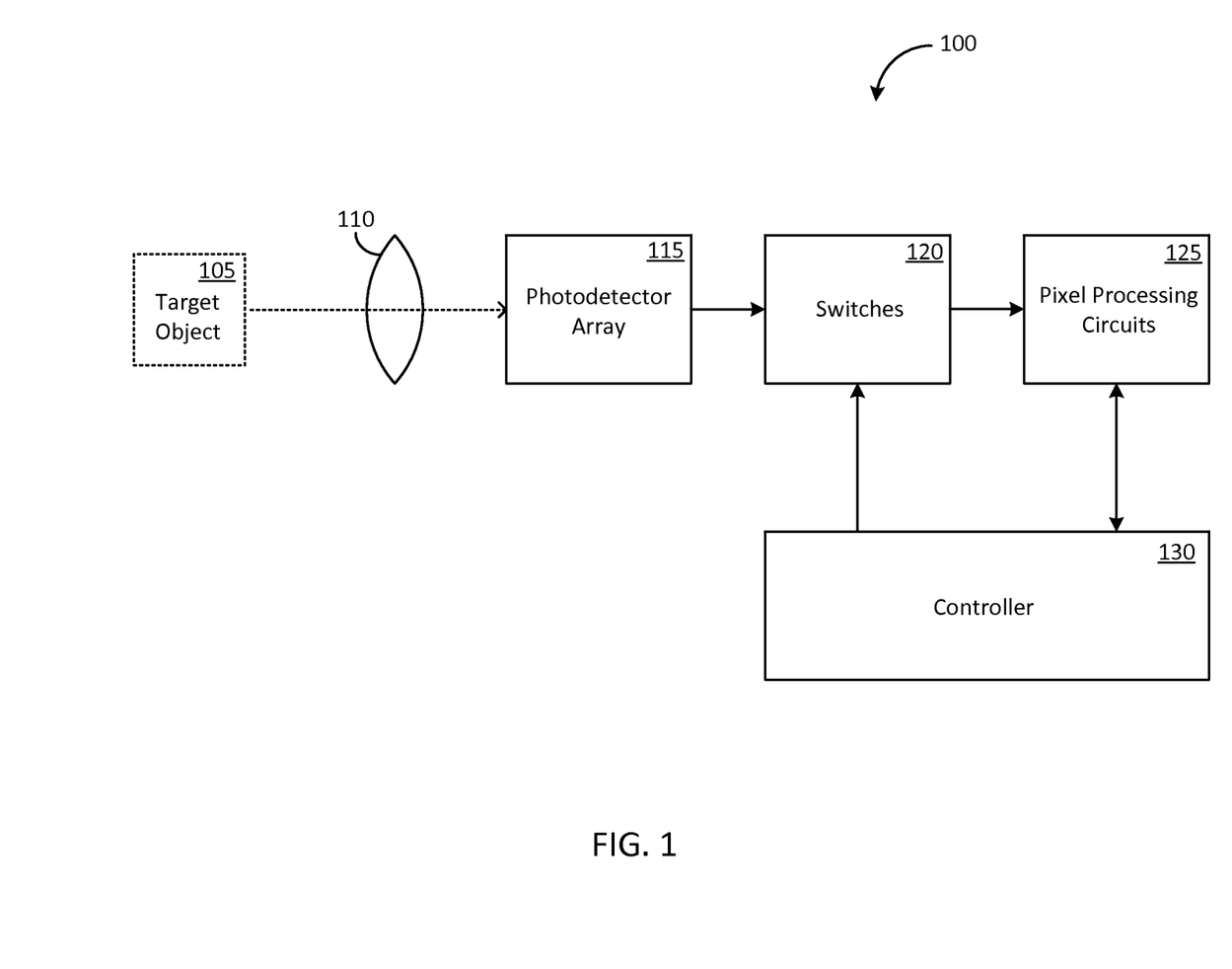
FIG. 1 shows a block diagram of an exemplary optical detection system in accordance with the disclosure.

Attention is now drawn to FIG. 1, which shows a block diagram of an exemplary optical detection system 100 in accordance with the disclosure. Optical detection system 100 includes one or more light focusing elements symbolically represented in FIG. 1 by a lens 110. The lens 110 directs light that is received in the optical detection system 100 towards a photodetector array 115. The photodetector array 115 can be configured to detect various types of incident light associated with a wide variety of applications. For example, in a first application, which is a scene capture application, the incident light can be indicative of various light intensities present on a target object 105 that is to be captured in image form. In a second application, which is a time-of-flight (TOF) optical distance measurement application, the incident light can correspond to light reflected by the target object 105 in response to a beam of light transmitted by the optical detection system 100 towards the target object 105. The time delay between transmission of the light beam by the optical measurement system 100 and receiving of the reflected light in the optical detection system 100 is used by the optical measurement system 100 to calculate a distance between the optical measurement system 100 and the target object 105.

Each individual photodetector in the photodetector array 115 can be selectively coupled to one or more pixel processing circuits in a set of pixel processing circuits 125 by activating one or more switches in a set of switches 120 that is interposed between the photodetector array 115 and the set of pixel processing circuits 125. A controller 130 can be used to activate the set of switches 120 and to control one or more operations of the set of pixel processing circuits 125. Additional details pertaining to the photodetector array 115, the set of switches 120, and the set of pixel processing circuits 125 is provided herein.

Figure 2:
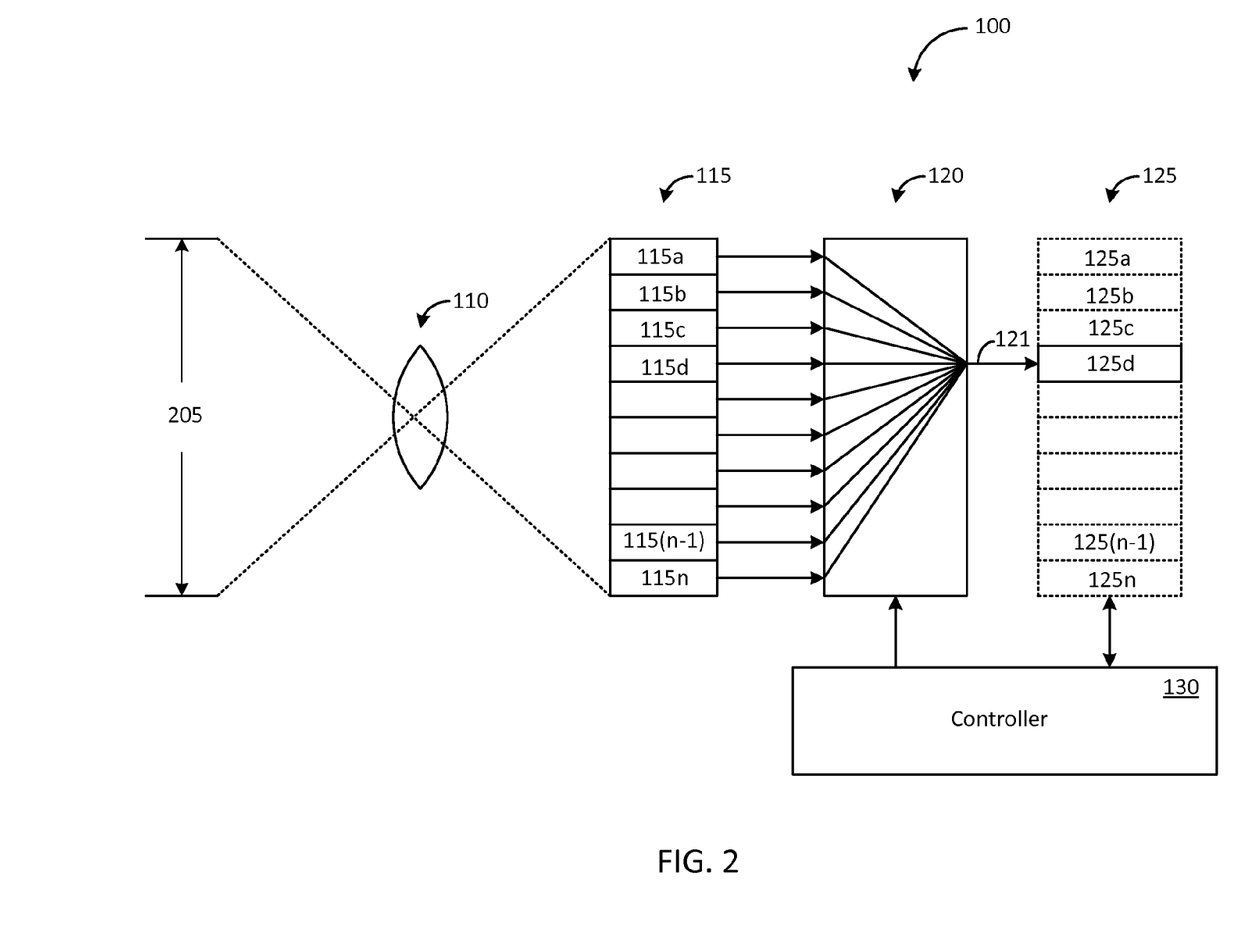
FIG. 2 shows an exemplary implementation of the optical detection system shown in FIG. 1, the exemplary optical detection system placed in a first mode of operation.

FIG. 2 shows a first exemplary implementation of the optical detection system 100 configured to operate in a first mode of operation in accordance with the disclosure. In this exemplary implementation, the photodetector array 115 includes "n" photodetectors (n≥2) that are individually labeled as 115a, 115b, . . . 115(n−1) and 115n. The set of pixel processing circuits 125 includes "n" pixel processing circuits (n≥2) that are individually labeled as 125a, 125b, . . . 125(n−1) and 125n. The set of switches 120 includes a number of switches (not shown) that can be provided in the form of a switch matrix, for example.

During the first mode of operation, the controller 130 activates various switches in the set of switches 120 such that all "n" photodetectors in the photodetector array 115 are connected into a single pixel processing circuit in the set of pixel processing circuits 125. In the example implementation shown in FIG. 2, the "n" photodetectors are coupled by the set of switches 120 to a single pixel processing circuit 125d (via a line 121).

However, in another example embodiment, the set of switches 120 can be activated so as to interconnect some or all of the "n" photodetectors to each other and to further connect these interconnected photodetectors to two or more pixel processing circuits that are also interconnected to each other. For example, the two or more pixel processing circuits may be used in some implementations wherein a single pixel processing circuit may be ineffective or inefficient, such as, for example, in terms of current handling capacity or in terms of handling input signal overload conditions.

The action of interconnecting multiple photodetectors to each other, or multiple pixel processing circuits to each other, is generally referred to herein as "clustering." Irrespective of the nature of the clustering, in each example embodiment, at least one pixel processing circuit in the set of pixel processing circuits 125 is left unconnected in accordance with the disclosure. The unconnected pixel processing circuits that are shown in FIG. 2 in dashed line outline, can be placed in an inactive state so as to minimize power consumption in the optical detection system 100. Thus, in accordance with the disclosure, during the first mode of operation, the power consumption of the optical detection system 100 is reduced as a result of connecting multiple photodetectors to a limited number of pixel processing circuits (one pixel processing circuit, in the example embodiment shown in FIG. 2).

Furthermore, during the first mode of operation, the lens 110 receives light from the target object 105 that is located at a distance away from the optical detection system 100. The lens 105 directs the received light into the photodetector array 115 thereby allowing the photodetector array 115 to detect any target object in the field of view 205 of the optical detection system 100.

The optical detection system 100 is retained in the first mode of operation as long as no target object is present in the coverage area. Once the target object 105 is present in the coverage area, light from the target object 105 is incident upon one or more of the photodetectors in the photodetector array 115. The pixel information generated by the one or more of the photodetectors is propagated to the pixel processing circuit 125d, which in turn provides the controller 130 with a signal to indicate the presence of the target object 105. Upon receiving the signal indicating the presence of the target object 105, the controller 130 reconfigures the optical detection system 100 to operate in a second mode of operation in accordance with the disclosure.

The first mode of operation of the optical detection system 100 can be interpreted as a low resolution mode of operation because the pixel processing circuit 125d operates in a manner that merely determines whether the target object 105 is present or not present and is unable to derive detailed spatial information pertaining to the target object 105. This is because the pixel processing circuit 125d is coupled to the photodetector array 115 in the above-described manner that prevents the pixel processing circuit 125d from having the capability to determine which specific one or more photodetectors in the photodetector array 115 has generated the target information.

Figure 3:
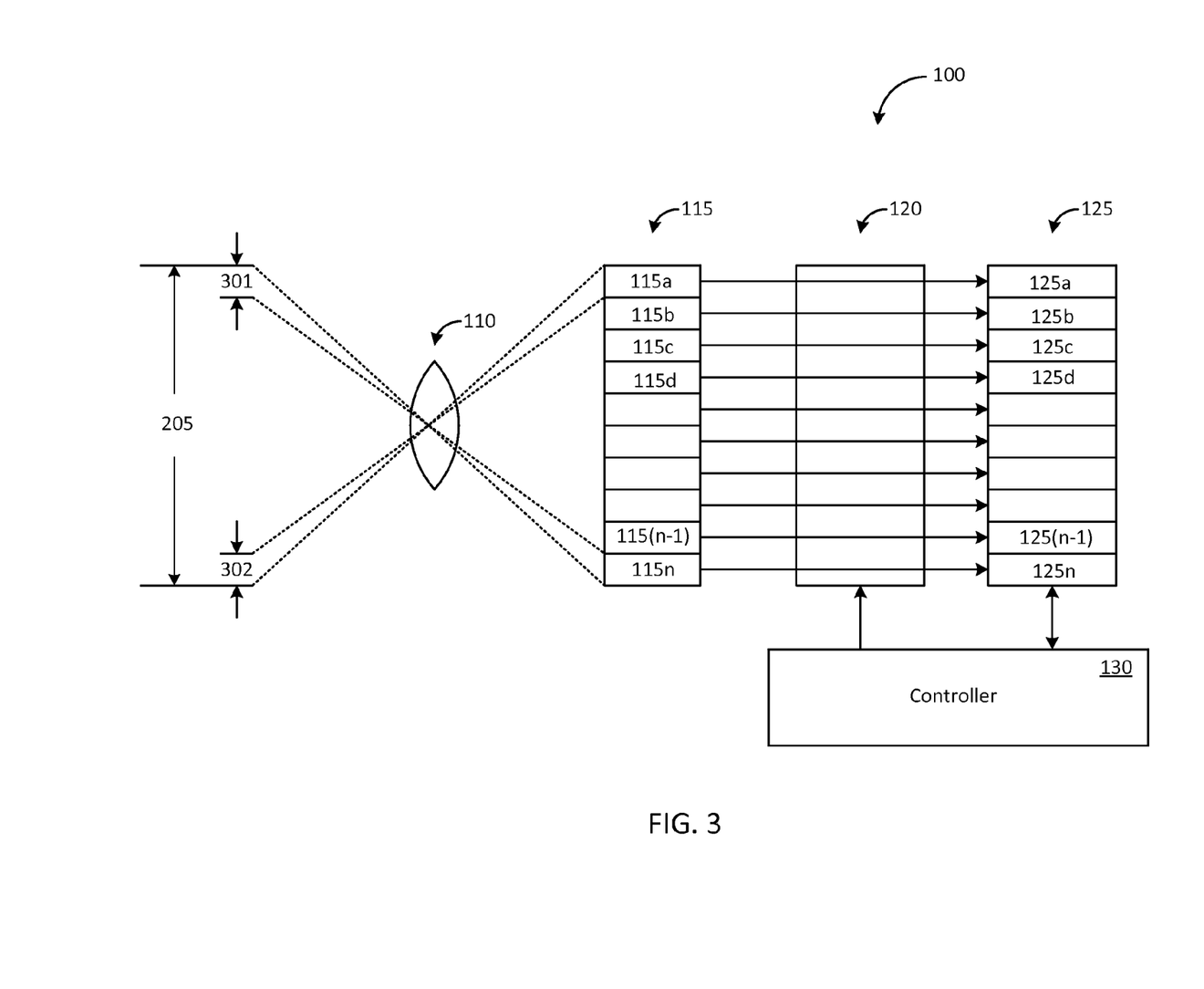
FIG. 3 shows the exemplary optical detection system of FIG. 2 when placed in a second mode of operation in accordance with the disclosure.

FIG. 3 illustrates a second mode of operation of the exemplary optical detection system 100. Unlike in the first mode of operation where the set of switches 120 is configured such that all "n" photodetectors in the photodetector array 115 are connected into a single pixel processing circuit (pixel processing circuit 125d), in the second mode of operation, each individual photodetector in the photodetector array 115 is connected into a respective one pixel processing circuit in the set of pixel processing circuits 125. Thus, for example, the photodetector 115a is connected to the pixel processing circuit 125a, the photodetector 115b is connected to the pixel processing circuit 125b, photodetector 115(n-1) is connected to the pixel processing circuit 125(n-1), and the photodetector 115n is connected to the pixel processing circuit 125n.

The second mode of operation of the optical detection system 100 can be interpreted as a high resolution mode of operation because the set of pixel processing circuits 125 is coupled to the photodetector array 115 in a one-to-one configuration that permits the set of pixel processing circuits 125 to derive detailed spatial information over the field of view 205. For example, the pixel processing circuit 125a can receive optical information from the photodetector 115a that corresponds to a sub-field 302 of the field of view 205, and the pixel processing circuit 125n can receive optical information from the photodetector 115n that corresponds to another sub-field 301 of the field of view 205. The other pixel processing circuits in the set of pixel processing circuits 125 can similarly derive optical information from corresponding sub-fields of view, thus allowing the set of pixel processing circuits 125 to obtain detailed optical information about not only the target object 105 (not shown) but any other object that may be present in the field of view 200.

In one or more alternative embodiments, a sub-set of the "n" photodetectors and the "n" pixel processing circuits can be used for executing one or both of the first mode of operation and the second mode of operation described herein. Thus, for example, if a lower resolution is acceptable, in the second mode of operation, a cluster of fewer than "n" photodetectors and/or a cluster of fewer than "n" pixel processing circuits can be used. The unutilized photodetectors and pixel processing circuits can be placed in a power down condition to conserve power.

Figure 4:
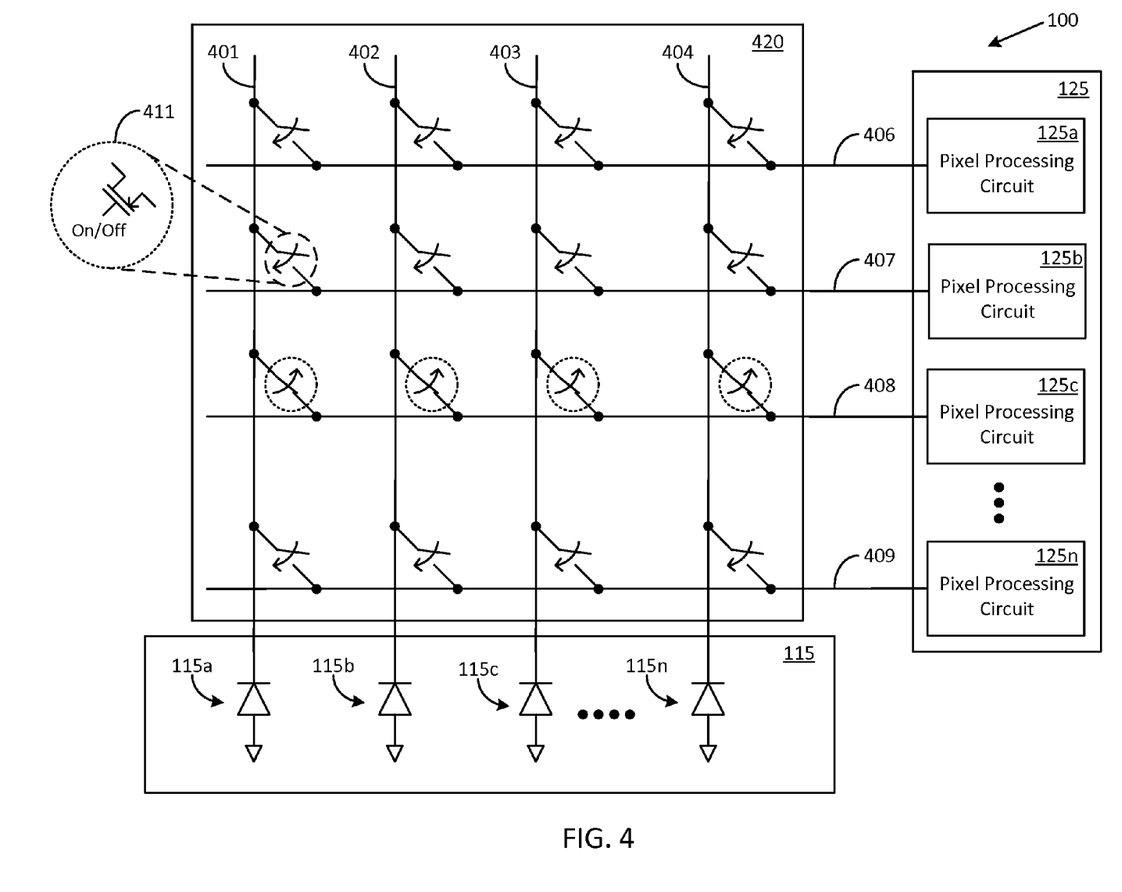
FIG. 4 shows another exemplary implementation of the optical detection system shown in FIG. 1, the exemplary optical detection system placed in the first mode of operation.

Attention is next drawn to FIG. 4, which shows the optical detection system 100 incorporating an exemplary implementation of the set of switches 120. In this exemplary implementation, the set of switches 120 is provided in the form of a switch matrix 420 having a row-column architecture. The switch matrix 420 has a switching element located at each intersection of a row and a column. Various types of switching elements can be used for this purpose, such as for example, a switching transistor 411 that is shown located at an intersection of a row 407 with a column 401.

Each photodetector of the photodetector array 115 is connected to a respective column of the switch matrix 420. For example, the photodetector 115a is connected to a column 401, the photodetector 115b is connected to a column 402, the photodetector 115c is connected to a column 403, and the photodetector 115n is connected to a column 404. Each pixel processing circuit of the set of pixel processing circuits 125 is connected to a respective row of the switch matrix 420. For example, the pixel processing circuit 125a is connected to a row 406, the pixel processing circuit 125b is connected to a row 407, the pixel processing circuit 125c is connected to a row 408, and the pixel processing circuit 125n is connected to a row 409.

When configured to operate in the first mode of operation (as described above with respect to FIG. 2), each switching element in one row of the switch matrix 420 is activated by the controller 130 (not shown) and placed in a closed condition. In the exemplary implementation shown in FIG. 4, each switching element in row 408 of the switch matrix 420 has been placed in a closed condition, thereby connecting a first terminal of each of the photodetector array 115 to each other and to the pixel processing circuit 125c. In this example implementation, the first terminal of each of the photodetector array 115 corresponds to a cathode of a photodiode. However, in other example implementations, the first terminal of each of the photodetector array 115 can correspond to an anode of a photodiode. One or more of the unconnected pixel processing circuits (i.e., other than the pixel processing circuit 125c) can be placed in an inactive state so as to minimize power consumption in the optical detection system 100.

In an alternative embodiment, the switching elements in each of "m" rows (m≤(n−1)) can be activated in order to connect the first terminal of each photodetector of the photodetector array 115 to each other and to "m" pixel processing circuits. The (m≤(n−1)) arrangement allows for at least one pixel processing circuit to be placed in an inactive condition thereby minimizing power consumption in the optical detection system 100.

Figure 5:
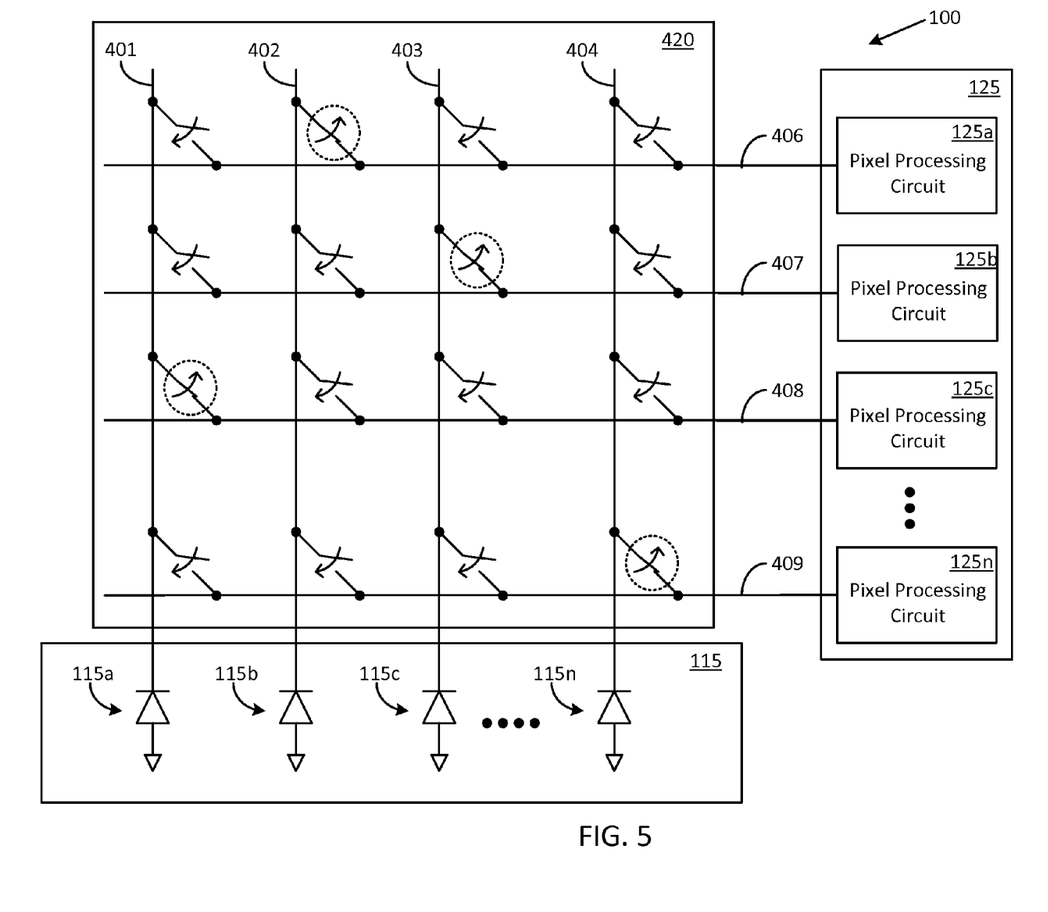
FIG. 5 shows the exemplary optical detection system of FIG. 4 when placed in the second mode of operation in accordance with the disclosure.

FIG. 5 shows the optical detection system 100 after the controller 130 (not shown) has reconfigured the optical detection system 100 (shown in FIG. 4) to operate in the second mode of operation in accordance with the disclosure. In the second mode of operation, each photodetector in the photodetector array 115 is connected to a respective one of the pixel processing circuits in the set of pixel processing circuits 125 by activating various switching elements in various rows and columns of the switching matrix 420. Thus, the photodetector 115a is shown connected to the pixel processing circuit 125c by activation of the switching element located at the intersection of the column 401 and the row 408, the photodetector 115b is shown connected to the pixel processing circuit 125a by activation of the switching element located at the intersection of the column 402 and the row 406, the photodetector 115c is shown connected to the pixel processing circuit 125b by activation of the switching element located at the intersection of the column 403 and the row 407, and the photodetector 115n is shown connected to the pixel processing circuit 125n by activation of the switching element located at the intersection of the column 404 and the row 409.

In alternative implementations, each photodetector in the photodetector array 115 can be connected to a different respective one of the pixel processing circuits by activating various other switching elements than the ones described above. In yet other alternative implementations, some of the pixel processing circuits can be left unconnected and placed in an inactive state.

Figure 6:
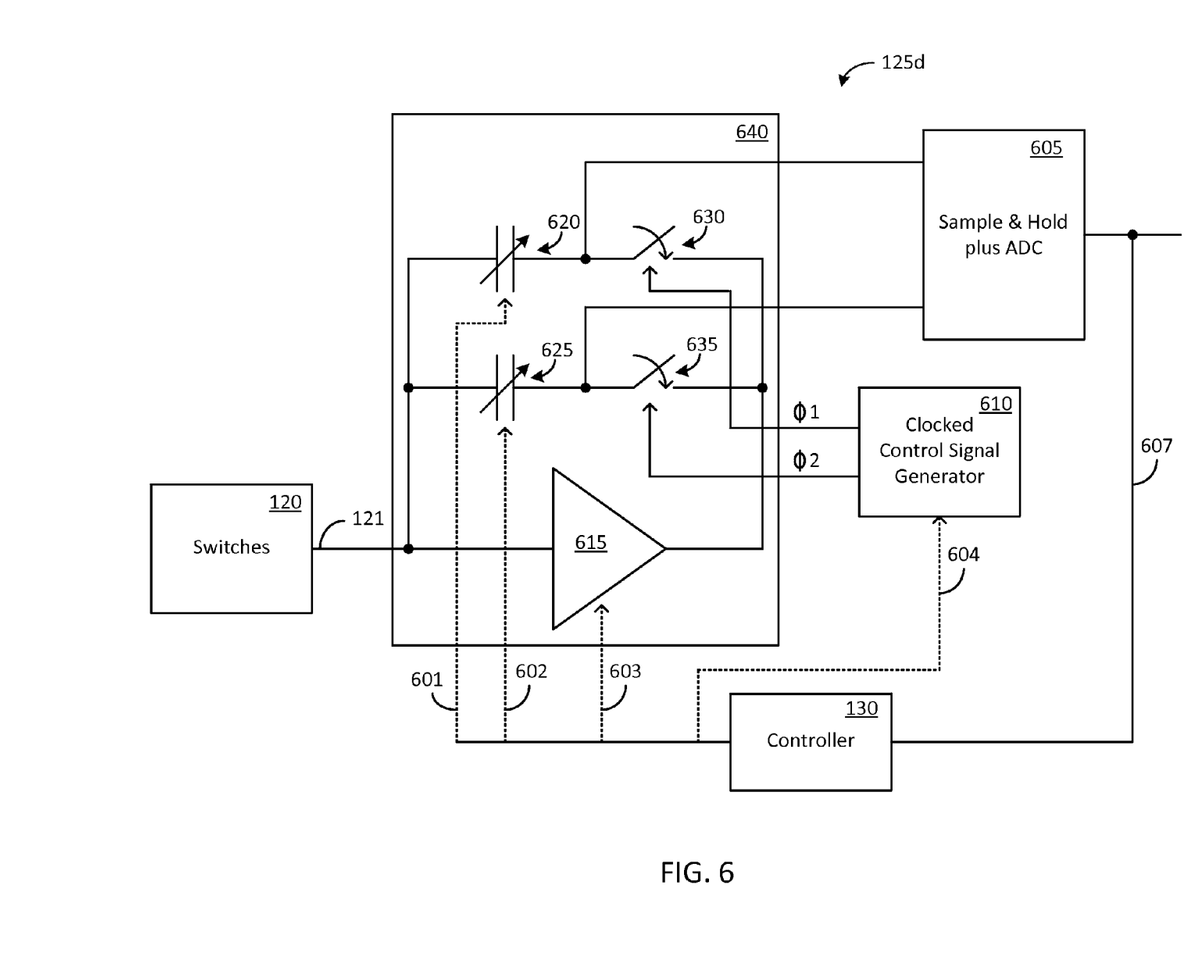
FIG. 6 shows an exemplary pixel processing circuit that can be part of the optical detection system shown in FIG. 1.

FIG. 6 shows an exemplary embodiment of the pixel processing circuit 125d that is shown used in FIG. 2 for executing the first mode of operation in accordance with the disclosure. The other pixel processing circuits in the set of pixel processing circuits 125 can be similar to, or identical to, the pixel processing circuit 125d shown in FIG. 6. In this exemplary embodiment, the pixel processing circuit 125d is implemented in the form of an adaptive three-dimensional (3D) correlator circuit. In other embodiments, other types of pixel processing circuits can be used in place of the adaptive 3D correlator circuit.

The adaptive 3D correlator circuit 640 incorporates an amplifier 615 having two feedback paths arranged in parallel with each other. The first feedback path includes a capacitor 620 that is coupled in series with a switch 630. The second feedback path includes a capacitor 625 that is coupled in series with another switch 635. In this exemplary embodiment, each of the capacitor 620 and the capacitor 625 is shown as a variable capacitor. However, in another embodiment, one or both of the capacitor 620 and the capacitor 625 can be implemented in the form of a bank of fixed value capacitors that can be individually selected under control of the controller 130. In yet another embodiment, wherein the 3D correlator circuit 640 is provided in the form of a fixed characteristic circuit (i.e., non-adaptive in nature), each of the capacitor 620 and the capacitor 625 can be a fixed value capacitor having a predetermined value.

The switch 630 is operated by a first control signal that is provided to the switch 630 by a clocked control signal generator 610. The switch 635 is operated by a second control signal that is provided to the switch 635 by the clocked control signal generator 610. The second control signal has a phase Φ2 that is different with respect to a phase Φ1 of the first control signal. In one exemplary embodiment, the phase Φ2 of the second control signal is opposite to the phase Φ1 of the first control signal, whereby the switch 635 and the switch 630 alternately couple a respective one of the capacitor 625 and capacitor 630 so as to provide two distinct feedback paths to the amplifier 615 at different times. Typically, the value of the capacitor 625 is set equal to the value of the capacitor 630. Each of the capacitor 625 and capacitor 630 executes an integration functionality upon an input photocurrent that is provided to the adaptive 3D correlator circuit 640 via line 121 (also shown in FIG. 2).

Line 121 can receive the photocurrent from the set of switches 120 when the optical detector system 100 is placed in the first mode of operation during which a cluster of photodetectors is coupled into the pixel processing circuit 125d (as shown in FIG. 2). Line 121 can further receive a different photocurrent from the set of switches 120 when the optical detector system 100 is placed in the second mode of operation during which a single photodetector (the photodetector 115d as shown in FIG. 3) is coupled into the pixel processing circuit 125d.

It can be understood that in the first mode of operation, the combined capacitance of the cluster of photodetectors that are interconnected to each other is larger than in the second mode of operation where the capacitance corresponds to a single photodetector (photodetector 115d, for example). Consequently, the amount of capacitance imposed upon line 121 during the first mode of operation is significantly higher than the amount of capacitance imposed upon line 121 during the second mode of operation.

The controller 130 can use line 601 as a part of the first mode of operation to provide a first control signal for setting a capacitance of the capacitor 620 to a first capacitance value that is determined, at least in part, on the basis of the combined capacitance of multiple photodetectors during the first mode of operation. When the capacitance of the capacitor 620 is set to the first capacitance value, the controller further uses line 602 as a part of the first mode of operation to provide another control signal for setting the value of the capacitor 620 to the same first capacitance value as the capacitor 620.

The controller 130 can then use lines 601 and 602 as a part of the second mode of operation to provide control signals for identically setting a capacitance of each of the capacitor 620 and the capacitor 625 to a second capacitance value that is typically different than the first capacitance value. The second capacitance value can be determined, at least in part, on the basis of the capacitance of a single photodetector during the second mode of operation.

Each, or both, of the first capacitance value and second capacitance values referred to above, can be determined by the controller 130 on the basis of various other factors, such as, for example, on the basis of an amount of photodiode current that appears on line 121 as a result of various light intensities that can be incident upon the photodetectors. For example, in a first example scenario, the amount of photodiode current that appears on line 121 can be high as a result of a high light intensity being incident upon one or more of the photodetectors. This can occur, for example, due to an object having high light reflectivity, or due to a large object being located close to the optical detection system 100. The amount of photodiode current that appears on line 121 can also be high as a result of a large number "n" of photodiodes being used, for example during the first mode of operation.

Typically, when the amount of photodiode current that appears on line 121 is high, the controller 130 sets each of the capacitor 620 and the capacitor 625 to an identical and relatively-high capacitance value, whereby the adaptive 3D correlator circuit 640 is configured to operate with low integration gain. The low integration gain can be attributed, at least in part, to a slower rate of voltage change that takes place in each of the capacitor 620 and the capacitor 625 as a result of the higher capacitance value.

However, in a second example scenario, the amount of photodiode current that appears on line 121 can be relatively low as a result of a low light intensity being incident upon the photodetectors. This can occur, for example, due to an object having relatively low light reflectivity, or due to a small object of interest being located relatively far from the optical detection system 100. The amount of photodiode current that appears on line 121 can also be relatively low as a result of a fewer number "n" of photodiodes being used, for example during the first mode of operation. Typically, when the amount of photodiode current that appears on line 121 is low, the controller 130 sets each of the capacitor 620 and the capacitor 625 to an identical and relatively-low capacitance value, whereby the adaptive 3D correlator circuit 640 is configured to operate with a relatively high integration gain. The high integration gain can be attributed, at least in part, to a faster rate of voltage change that takes place in each of the capacitor 620 and the capacitor 625 as a result of the lower capacitance value.

Various factors, such as those described in the examples above, can also be used by the controller 130 to provide a control signal via a line 603 for setting suitable gain and/or bandwidth parameters of the amplifier 615 and to provide a control signal via line 604 to the clocked control signal generator 610 for setting various timing parameters of the clocked control signal generator 610. This arrangement allows the clocked control signal generator 610 to provide to the adaptive 3D correlator circuit 640, various settable modulating frequencies that can prove advantageous when the optical detection system 100 is implemented as a TOF distance measurement system, for example.

A differential output of the adaptive 3D correlator circuit 640 is coupled into a circuit 605 that can include a sample and hold circuit and an analog-to-digital converter (ADC). As can be understood, the output of the circuit 605 is a digital representation of the input photocurrent on line 121 after a correlation operation is executed upon the photocurrent by the adaptive 3D correlator circuit 640. The output of the circuit 605 constitutes light intensity measurement results of the pixel processing circuit 125d that can be provided to the controller 130 via a line 607.

Figure 7:
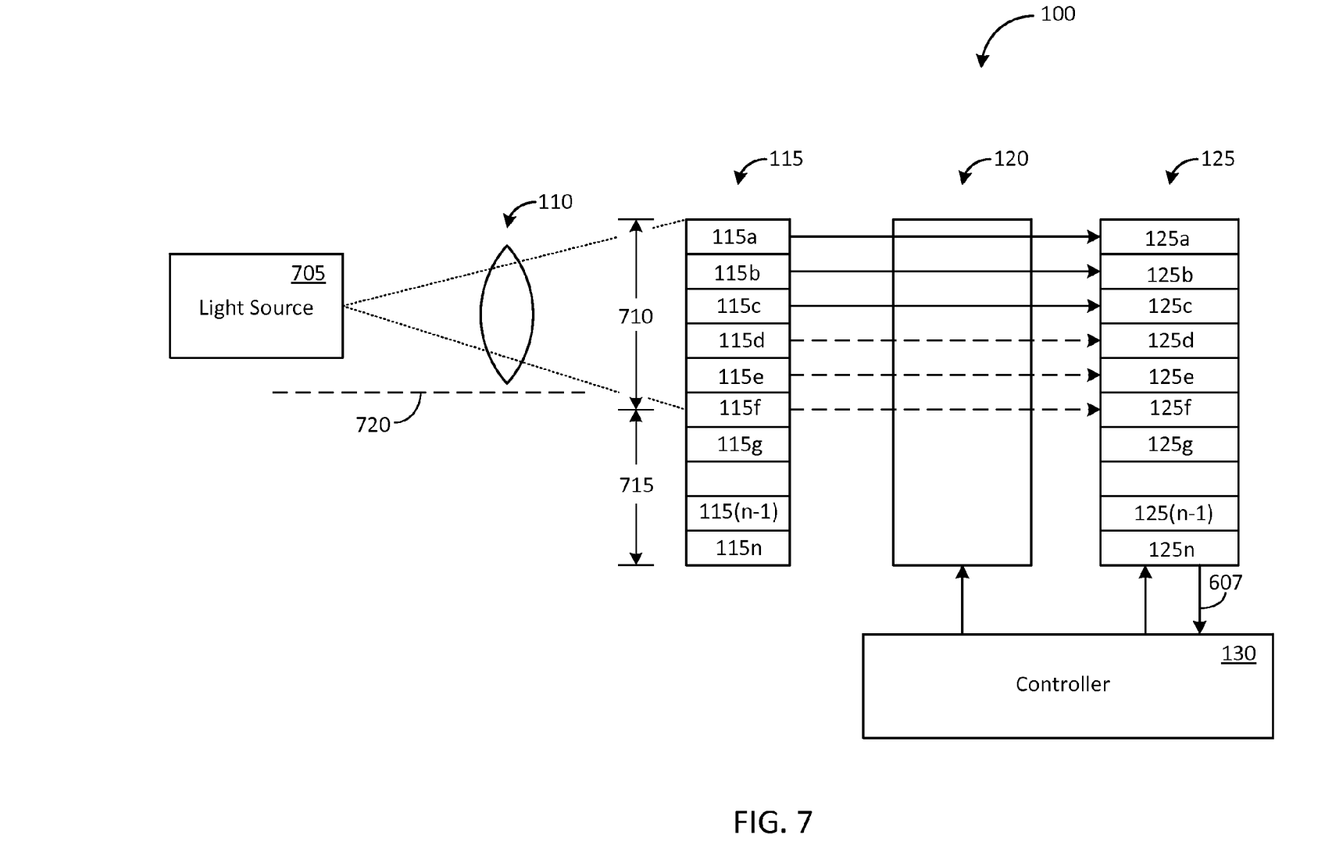
FIG. 7 shows yet another exemplary implementation of the optical detection system shown in FIG. 1, the exemplary optical detection system placed in a third mode of operation in accordance with the disclosure.

FIG. 7 shows an exemplary embodiment of the optical detection system 100 configured to operate in a third mode of operation in accordance with the disclosure. The third mode of operation can be used for example, to execute a cluster-based light intensity measurement procedure. The cluster-based light intensity detection procedure includes detecting a difference in light intensities between two or more photodetector clusters and using the detected difference for various purposes such as, for example, to carry out a lens alignment procedure, to detect a lens misalignment, to perform a calibration procedure, and/or to perform a manufacture-related procedure.

An exemplary manufacture-related procedure will now be disclosed in order to elaborate upon the cluster-based light intensity measurement procedure in accordance with the disclosure. The manufacture-related procedure can be executed, for example, upon a consumer device such as a cellular phone incorporating a digital camera. Thus, the optical detection system 100 shown in FIG. 7 can be viewed as a cellular phone that has come off an assembly line with a manufacturing defect that requires addressing. This exemplary manufacturing defect is characterized by the lens 110 being offset with respect to a central longitudinal axis 720 of the photodetector array 115. The offset, which is generally undesirable, can occur for example, as a result of a manufacturing equipment tolerance or as a result of improper manual assembly.

As a part of the exemplary manufacture-related procedure directed at addressing this defect, a light source 705 is used to direct a beam of light towards the lens 110. The lens 110 directs the received light towards a first portion 710 of the photodetector array 115 leaving a second portion 715 unilluminated due to the lens offset. Consequently, each of the photodetectors 115a through 115f generates a photocurrent and each of the photodetectors 115g through 115n fails to generate a detectable amount of photocurrent.

The controller 130 activates a sub-set of switches in the set of switches 120 such that the individual photocurrents generated by the photodetectors 115a through 115f are connected into respective pixel processing circuits in the set of pixel processing circuits 125 and the remaining photodetectors in the photodetector array 115 are left unconnected.

In the exemplary embodiment shown in FIG. 7, each of the photodetectors 115a, 115b, and 115c is coupled via the sub-set of switches to corresponding pixel processing circuits 125a, 125b, and 125c. The pixel processing circuits 125a, 125b, and 125c cooperate with additional circuitry described above (the circuit 605, the clocked control signal generator 610 etc.) to generate a first light intensity measurement result that is provided to the controller 130 via the line 607.

The controller 130 then activates another sub-set of switches in the set of switches 120 such that the individual photocurrents generated by another cluster of photodetectors are coupled into respective pixel processing circuits in the set of pixel processing circuits 125. This second connection is indicated by the dashed lines interconnecting the photodetector array 115 to the set of pixel processing circuits 125. The previous connections between the photodetectors 115a, 115b, and 115c and the pixel processing circuits 125a, 125b, and 125c are disconnected thereby allowing the set of pixel processing circuits 125 to provide a second light intensity measurement result to the controller 130 via the line 607.

The operations described above are repeated for all "n" photodetectors and the various light intensity measurement results are used by the controller 130 to determine that the lens 110 is optically aligned with only the first portion 710 of the photodetector array 115. Upon making this determination, additional steps can be taken such as, for example, moving the lens 110 to align the lens 110 with the longitudinal axis 720 of the photodetector array 115, or disabling the photodetectors 115g through 115n and the corresponding pixel processing circuits 125g through 125n. Disabling the photodetectors 115g through 115n and the corresponding pixel processing circuits 125g through 125n can be carried out for example, by eliminating power supply connections to these dysfunctional elements, thus eliminating on a permanent basis, unnecessary power consumption in the cellular phone.

In some example embodiments, the "n" number of photodetectors in the photodetector array 115 of the cellular phone can be intentionally selected beforehand to be larger than needed (by using a larger detector sensor array, for example) and the unused photodetectors can be identified and disabled using the procedure described above. Such an approach can provide cost benefits in terms of accommodating lens misalignment issues and other such issues during manufacture of the cellular phone.

Figure 8:
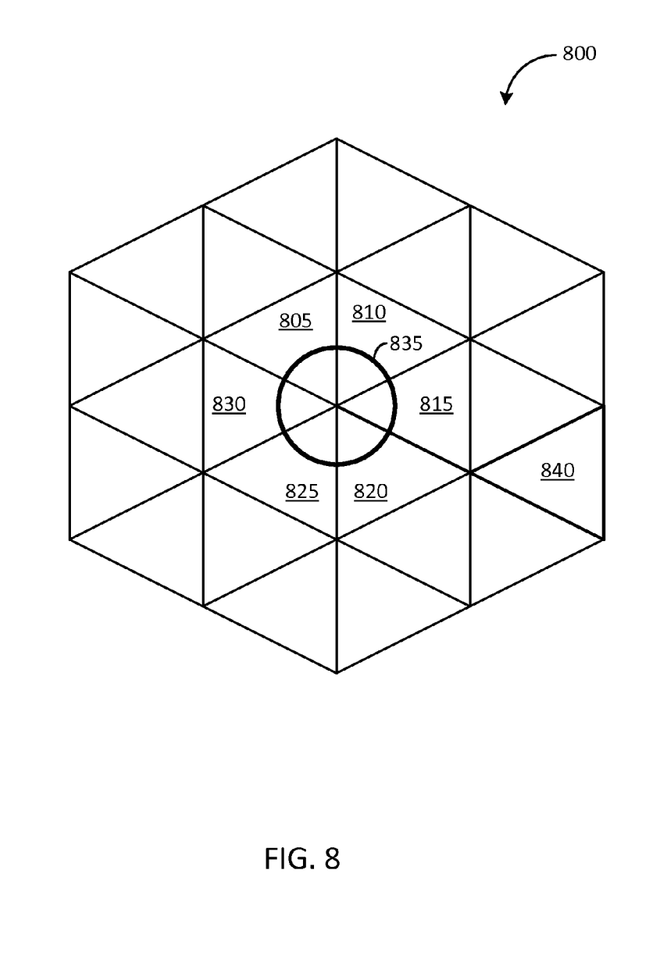
FIG. 8 shows a first exemplary photodetector array that can be part of the optical detection system shown in FIG. 1.

Attention is next drawn to FIG. 8, which shows a first exemplary photodetector array 800 that can be used for implementing the photodetector array 115 that is shown in FIG. 1. Unlike some traditional photodetector arrays that have square-shaped or rectangular-shaped photodetector elements and an overall square-shaped or rectangular-shaped profile, the photodetector array 800 is composed of triangular photodetector elements that are collectively arranged to form a hexagonal profile for the photodetector array 115.

In this example embodiment, a circle 835 represents a desired field of view that can be used during a low power mode of operation of the optical device 100 in accordance with the disclosure. In the low power mode of operation, a cluster of six photodetectors 805, 810, 815, 820, 825, and 830 can be placed in an active state together with the corresponding pixel processing circuits (not shown), and some or all of the remaining photodetectors of the photodetector array 800 (such as the photodetector 840) can be placed in an inactive state in order to minimize power consumption in the optical device 100.

The cluster of six photodetectors 805, 810, 815, 820, 825, and 830 allows detection of not only stationary target objects that may be present in the desired field of view but also helps in determining a direction of movement of any target object that moves across the desired field of view. For example, when a moving target object is first detected via the photodetector 810, followed by detection of the object via the photodetector 805, the controller 130 (not shown) can conclude that the target object is moving from right to left. The triangular shape of the photodetectors further allow for detection of movement of a target object in diagonal directions and/or random directions.

Upon detecting a stationary target object (or a moving target object), some or all of the remaining photodetectors of the photodetector array 800 can be transitioned from the inactive state to an active state and the optical detection device placed in a normal power mode of operation that provides a larger field of view with increased resolution as described above with respect to FIG. 3.

Figure 9:
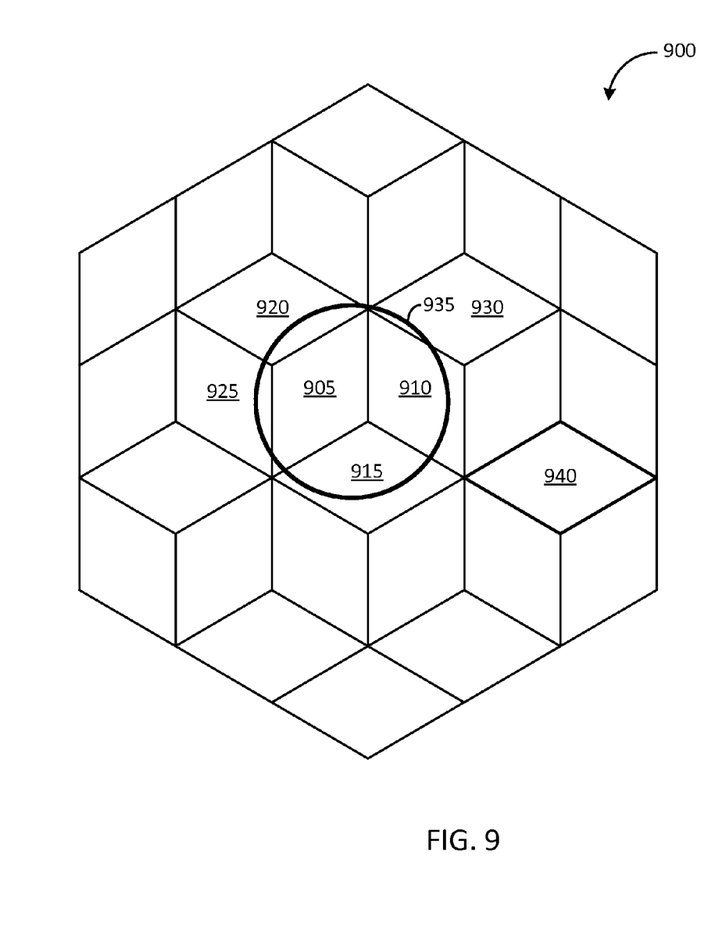
FIG. 9 shows a second exemplary photodetector array that can be part of the optical detection system shown in FIG. 1.

FIG. 9 shows a second exemplary photodetector array 900 that can be used for implementing the photodetector array 115 that is shown in FIG. 1. Each of the photodetectors in the photodetector array 900 has a diamond shape that provides benefits that are slightly different than those described above with respect to the photodetector array 800. For example, the photodetector array 900 can provide for higher resolution when tracking a target object that is moving in a radial direction.

In addition to the various shapes described above with respect to FIGS. 8 and 9, in other exemplary implementations, each photodetector or photodetector segment of a photodetector array can have various other shapes, such as, for example, a hexagonal shape. The overall profile of the photodetector array can also have various shapes, such as, for example, a hexagonal shape or a triangular shape. Such shapes allow for minimizing power consumption by eliminating power being provided to photodetectors that are redundant or ineffective for use in an optical detection system.

Figure 10:
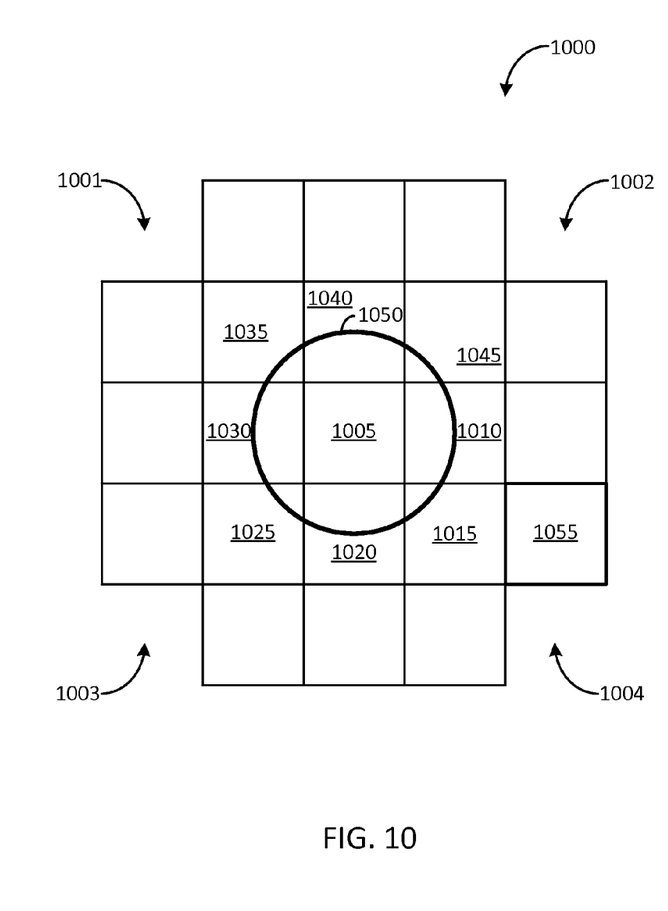
FIG. 10 shows a third exemplary photodetector array that can be part of the optical detection system shown in FIG. 1, the third exemplary photodetector array having a detection area that allows the optical detection system to operate with a first field of view in a fourth mode of operation.
Figure 11:
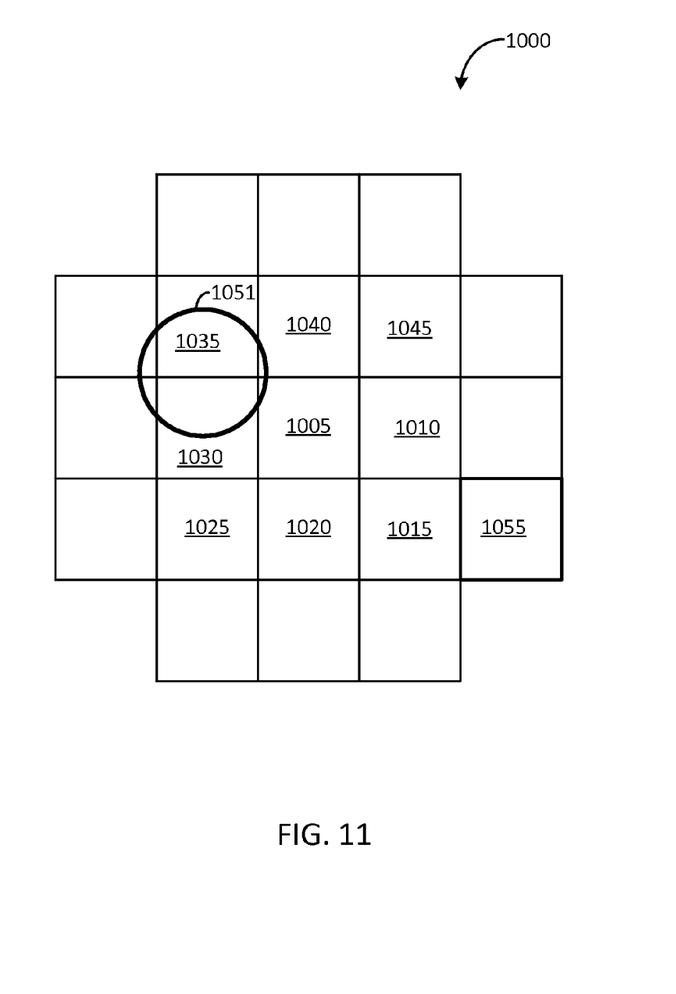
FIG. 11 shows the third exemplary photodetector array shown in FIG. 10, the detection area of the third exemplary photodetector array allowing the optical detection system to operate with a different field of view as a part of the fourth mode of operation.

FIGS. 10 and 11 show a third exemplary photodetector array 1000 that can be part of the optical detection system 100. The third exemplary photodetector array 1000 has a large detection area that allows the optical detection system 100 to use adjustable fields of view when operating in a fourth mode of operation. In this exemplary embodiment, each of the photodetectors in the photodetector array 1000 has a square shape or a rectangular shape.

FIG. 10 shows a circle 1050 that is indicative of a first desired field of view during a first period of time that is a part of the fourth mode of operation of the optical detection system 100. The circle 1050 is shown with a center located in a photodetector 1005 and encompassing several other adjacently located photodetectors. The remaining photodetectors outside the circle 1050, such as, for example, the photodetector 1055, can be placed in an inactive state.

Particular attention is drawn to the four photodetectors located at the four corners of the photodetector array 1000. Each of photodetectors 1001, 1002, 1003, and 1004 can be placed in a permanently disabled state for minimizing power consumption while the other photodetectors can be placed in either in an active state or an inactive state as desired for various operations.

FIG. 11 shows a circle 1051 that is indicative of a different field of view that is used during another period of time as a part of the fourth mode of operation. The circle 1051, which is shown with a center located at a boundary between the photodetector 1030 and the photodetector 1035 and encompassing several adjacent photodetector segments, can have a different diameter than the circle 1050 shown in FIG. 10. The change in size of the two fields of view between FIGS. 10 and 11 can be carried out by suitably disabling and enabling various photodetector segments in the photodetector array 1000 thereby allowing a high level of flexibility in various optical detection applications that may require various levels of resolution, various fields of view, and various levels of power conservation.

In summary, it should be noted that the invention has been described with reference to a few illustrative embodiments for the purpose of demonstrating the principles and concepts of the invention. It will be understood by persons of skill in the art, in view of the description provided herein, that the invention is not limited to these illustrative embodiments. Persons of skill in the art will understand that many variations can be made to the illustrative embodiments without deviating from the scope of the invention.

What is claimed is:

1. An optical detection system comprising:
a photodetector array;
a set of pixel processing circuits;
a set of switches interposed between the photodetector array and the set of pixel processing circuits; and
a controller operable to control the set of switches for placing the optical detection system in one of a low resolution mode of operation or a high resolution mode of operation, the low resolution mode of operation characterized by at least a first pixel processing circuit being placed in an active state for detecting an optical input and by a remainder of pixel processing circuits being placed in an inactive state for reducing power consumption, the low resolution mode of operation further characterized by actuation of a first subset of switches in the set of switches to connect a first terminal of each photodetector of the photodetector array to each other and to the first pixel processing circuit, the high resolution mode of operation characterized by at least a subset of the remainder of pixel processing circuits being placed in an active state upon detecting of the optical signal by the first pixel processing circuit and by actuation of a second subset of switches to individually couple the first terminal of each photodetector of a subset of photodetectors of the photodetector array to a respective one of the at least a subset of the remainder of pixel processing circuits.

2. The system of claim 1, wherein the first pixel processing circuit is configured to apply at least a first time constant when processing the optical input during the low resolution mode of operation, and to apply at least a second time constant that is different than the first time constant when processing the optical input during the high resolution mode of operation.

3. The system of claim 2, wherein the first pixel processing circuit comprises an amplifier circuit that includes a first feedback path arranged in parallel with a second feedback path, the first feedback path including a first capacitor connected in series with a first switch and the second feedback path having a second capacitor connected in series with a second switch.

4. The system of claim 3, wherein the first switch is controlled by a first control signal and the second switch is controlled by a second control signal, the second control signal having a different phase than the first control signal.

5. The system of claim 4, wherein at least one of the first capacitor or the second capacitor is a variable capacitor.

6. The system of claim 1, wherein the optical input to the first pixel processing circuit during the low resolution mode of operation is a summation of individual currents originated by two or more photodetectors of the photodetector array.

7. The system of claim 1, wherein each photodetector in the photodetector array has one of a quadrilateral profile, a triangular profile, or a hexagonal profile.

8. The system of claim 1, wherein the subset of photodetectors used in the high resolution mode of operation is determined on the basis of a first field of view that is smaller than a second field of view offered by the set of photodetectors in the low resolution mode of operation.

9. The system of claim 1, wherein each of the set of pixel processing circuits is a correlator circuit.

10. An optical detection system comprising:
a photodetector assembly comprising a plurality of photodetector segments;
a set of pixel processing circuits;
a set of switches interposed between the photodetector assembly and the set of pixel processing circuits; and
a controller operable to control the set of switches for placing the optical detection system in one of a first mode of operation or a second mode of operation, the first mode of operation characterized by actuation of a first subset of switches to couple at least a first subset of photodetector segments to a first subset of pixel processing circuits, the second mode of operation characterized by actuation of a second subset of switches to couple at least a second subset of photodetector segments to a second subset of pixel processing circuits.

11. The system of claim 10, wherein the first mode of operation is a low resolution mode of operation, the second mode of operation is a high resolution mode of operation, the first subset of photodetector segments is located in a first portion of the photodetector assembly, and the second subset of photodetector segments is located in a second portion of the photodetector assembly.

12. The system of claim 11, wherein the first subset of pixel processing circuits used during the low resolution mode of operation is smaller in number than the second subset of pixel processing circuits used during the high resolution mode of operation.

13. The system of claim 10, wherein the first mode of operation is directed at a first light intensity measurement procedure, the second mode of operation is directed at a second light intensity measurement procedure, and the controller is operable to determine a difference in light intensities between the first subset of photodetector segments and the second subset of photodetector segments.

14. The system of claim 13, wherein each of the first light intensity measurement procedure and the second light intensity measurement procedure is a part of at least one of a lens alignment procedure, a lens misalignment determination procedure, or a procedure for disabling at least one photodetector in the photodetector assembly.

15. The system of claim 13, further comprising using the determined difference in light intensities between the first subset of photodetector segments and the second subset of photodetector segments to place one or more pixel processing circuits in one of an inactive state or a disabled state for reducing power consumption in the optical detection system.

16. An optical detection system comprising:
a plurality of switches configured as a switch matrix;
a plurality of photodetectors, each of the plurality of photodetectors coupled to a respective column of the switch matrix;
a plurality of pixel processing circuits each of the plurality of pixel processing circuits coupled to a respective row of the switch matrix; and
a controller operable to place the optical detection system in one of a low resolution mode of operation or a high resolution mode of operation, wherein the low resolution mode of operation is characterized in part, by the controller actuating a first row of switches of the switch matrix for placing the plurality of photodetectors in a parallel coupling configuration and for providing at an input terminal of a first pixel processing circuit, a first input signal that is a summation of individual currents originated by the plurality of photodetectors in the parallel coupling configuration, and wherein the high resolution mode of operation is characterized in part, by the controller actuating a single switch in each of a set of columns of the switch matrix for coupling a respective individual current originated by each of a set of photodetectors to a respective one of a set of pixel processing circuits.

17. The system of claim 16, wherein the first pixel processing circuit is configured to use at least a first time constant when processing the first input signal in the low resolution mode of operation, and to use at least a second time constant when processing the respective individual current originated by each of the set of photodetectors in the high resolution mode of operation.

18. The system of claim 17, wherein the first pixel processing circuit comprises a variable capacitor that is used to provide at least one of the first time constant or the second time constant, the variable capacitor arranged in a feedback path of an amplifier circuit.

19. The system of claim 16, wherein each of the plurality of photodetectors constitutes a segment of a photodetector assembly, each segment having one of a quadrilateral profile, a triangular profile, or a hexagonal profile.

20. The system of claim 16, wherein the low resolution mode of operation is further characterized by one or more of the pixel processing circuits other than the first pixel processing circuit being placed in an inactive state for reducing power consumption in the optical detection system.

* * * * *